(12) United States Patent
Motoyama et al.

(10) Patent No.: US 10,750,673 B2
(45) Date of Patent: Aug. 25, 2020

(54) ILLUMINATION APPARATUS WITH LIGHT GUIDE PROVIDED BETWEEN LINEARLY ARRANGED LIGHT SOURCES

(71) Applicant: PANASONIC INTELLECTUAL PROPERTY MANAGEMENT CO., LTD., Osaka (JP)

(72) Inventors: Keita Motoyama, Osaka (JP); Yuko Fukui, Osaka (JP); Hiroyasu Kubo, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 59 days.

(21) Appl. No.: 16/122,368

(22) Filed: Sep. 5, 2018

(65) Prior Publication Data

US 2019/0075734 A1    Mar. 14, 2019

(30) Foreign Application Priority Data

Sep. 8, 2017 (JP) .................. 2017-173253
Jun. 27, 2018 (JP) .................. 2018-122319

(51) Int. Cl.
*A01G 7/04* (2006.01)
*F21V 8/00* (2006.01)
*A01G 9/24* (2006.01)

(52) U.S. Cl.
CPC ............ *A01G 7/045* (2013.01); *A01G 9/249* (2019.05); *G02B 6/003* (2013.01); *G02B 6/005* (2013.01); *G02B 6/0016* (2013.01); *G02B 6/0021* (2013.01); *G02B 6/0035* (2013.01); *G02B 6/0046* (2013.01); *G02B 6/0068* (2013.01);

(Continued)

(58) Field of Classification Search
CPC . A01G 7/045; F21V 2200/13; F21V 2200/10; G02B 6/0008; G02B 6/0071; G02B 6/007; G02B 6/262; F21K 9/61
USPC .................................................. 362/563, 576
See application file for complete search history.

(56) References Cited

U.S. PATENT DOCUMENTS 1,837,091 A  *  12/1931  Adams ................ F21V 7/0008
                                                  362/301
2,589,569 A  *   3/1952  Hurst .................... G09F 9/305
                                                  340/815.56

(Continued)

FOREIGN PATENT DOCUMENTS

| JP | 60-076886 U | 5/1985 |
| JP | 10-104436 A | 4/1998 |
| JP | 2015-119660 | 7/2015 |

OTHER PUBLICATIONS

U.S. Appl. No. 15/779,759 to Takeshi Fujiyama et al., which was filed on May 29, 2018.

*Primary Examiner* — Ismael Negron
(74) *Attorney, Agent, or Firm* — Greenblum & Bernstein, P.L.C.

(57) ABSTRACT

An illumination apparatus includes first and second light sources arranged substantially linearly; and a light guide member having first and second light receiving portions, and a light emitting portion. The light receiving portions are configured to refract light from the first and second light sources toward the light emitting portion; and the light emitting portion is configured to refract light from the light receiving portions toward a space between the first and second light sources.

18 Claims, 8 Drawing Sheets

(52) U.S. Cl.
CPC ......... *G02B 6/0088* (2013.01); *G02B 6/0091* (2013.01)

(56) References Cited

U.S. PATENT DOCUMENTS

| | | | | |
|---|---|---|---|---|
| 3,352,277 | A * | 11/1967 | Schmidt | G02B 6/001 116/202 |
| 5,357,592 | A * | 10/1994 | Neilson | G02B 6/2817 385/47 |
| 6,341,876 | B1 * | 1/2002 | Moss | G02B 6/0006 362/243 |
| 6,749,313 | B2 * | 6/2004 | Ludwig | G02B 6/0038 362/340 |
| 7,163,327 | B2 * | 1/2007 | Henson | B60Q 1/0011 362/554 |
| 7,178,942 | B2 * | 2/2007 | Chen | G02B 6/0028 362/231 |
| 10,429,565 | B2 * | 10/2019 | Preston | F21V 7/0033 |
| 2010/0139165 | A1 * | 6/2010 | Oyama | A01G 7/045 47/1.01 R |

* cited by examiner

ILLUMINATION APPARATUS WITH LIGHT GUIDE PROVIDED BETWEEN LINEARLY ARRANGED LIGHT SOURCES

BACKGROUND

1. Technical Field

The present disclosure relates to a plant cultivation apparatus that performs cultivation of a plant using light which is emitted from a plurality of light sources.

2. Description of the Related Art

A plant cultivation apparatus is disclosed, for example, in Japanese Patent Unexamined Publication No. 2015-119660 (PLT 1).

SUMMARY

A plant cultivation apparatus includes an illuminator, and a light guide member.

The illuminator includes a first light source and a second light source which are arranged in series.

The light guide member includes a first light receiver, a light emitter, and a second light receiver, and is disposed to cover at least a portion of a non-light emitting portion between the first light source and the second light source.

In the light guide member, the first light receiver, the light emitter, and the second light receiver are disposed in this order.

The first light receiver receives a first light which is emitted from the first light source, refracts and outputs the first light toward the light emitter.

The second light receiver receives a second light which is emitted from the second light source, refracts and outputs the second light toward the light emitter.

The light emitter receives the first light and the second light, refracts and irradiates a plant cultivation space facing the non-light emitting portion with the first light and the second light.

DETAILED DESCRIPTIONS

In a configuration of the related art, there is a case where a variation of a light quantity is generated within a cultivation region.

Hereinafter, exemplary embodiments of the present disclosure will be described with reference to the drawings.

Exemplary Embodiment 1

Figure 1:
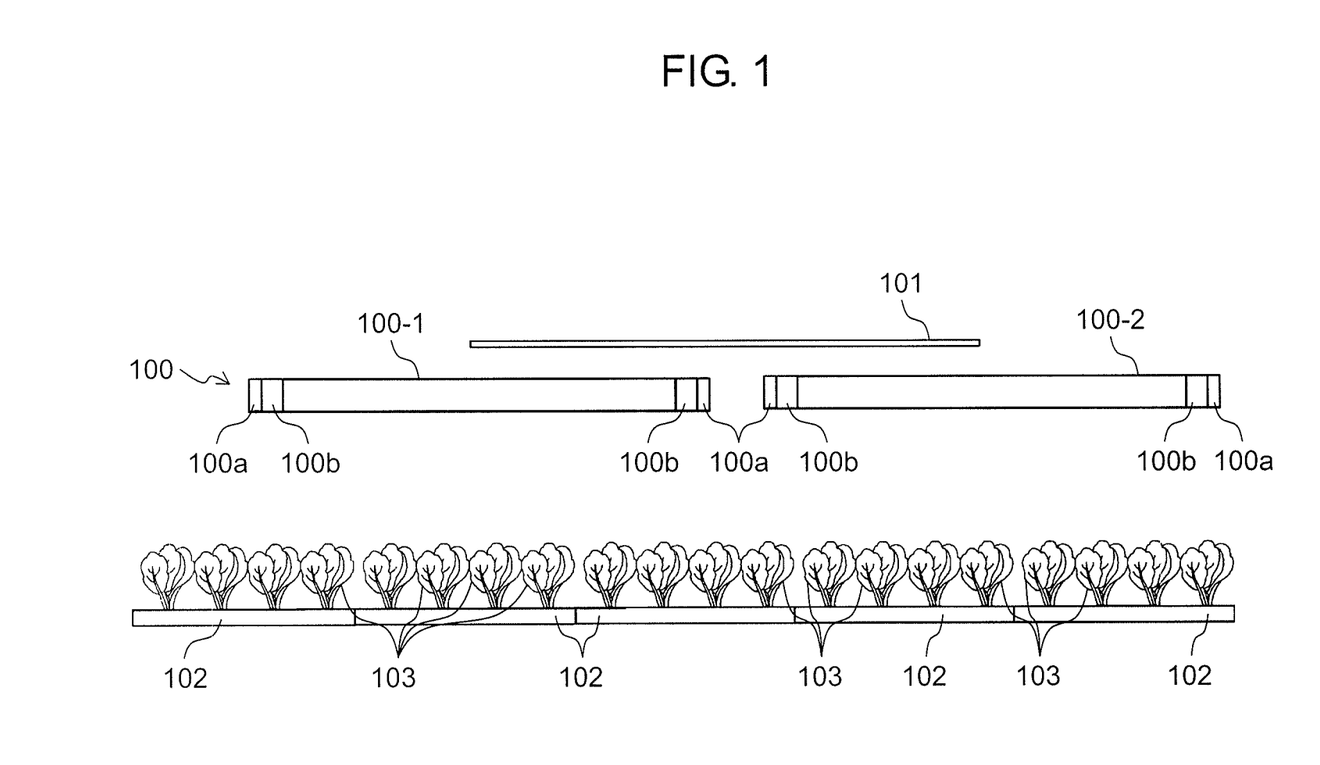
FIG. 1 is a schematic diagram of a plant cultivation apparatus according to Exemplary Embodiment 1 of the present disclosure.

FIG. 1 is a schematic diagram of a plant cultivation apparatus according to Exemplary Embodiment 1.

A plant cultivation apparatus includes illuminator 100, and light guide member 101. Illuminator 100 includes first light source 100-1 (first artificial light source), and second light source 100-2 (second artificial light source). The plant cultivation apparatus performs cultivation of a plant which is disposed in a plant cultivation space, using light L1 (see FIG. 3D) which is emitted from first light source 100-1, and light L2 (see FIG. 3D) which is emitted from second light source 100-2. In Exemplary Embodiment 1, two light sources are illustrated as an example, but three or more light sources may be used.

In FIG. 1, an illustration of a device configuration other than a configuration according to the present disclosure, such as a cultivation bed or a cultivation shelf which is disposed in the plant cultivation space is omitted. However, the plant cultivation apparatus according to the present disclosure is not specifically illustrated, but the plant cultivation apparatus according to the present disclosure may include an air conditioner that is capable of optionally controlling a temperature, humidity, and a concentration of $CO_2$, a nutrient solution controlling apparatus that controls a condition of a nutrient solution or the like, the cultivation bed through which the nutrient solution is circulated, and the like. The plant cultivation apparatus controls a cultivation environment to make a suitable environment in accordance with plant 103 to be cultivated.

Illuminator 100 is formed of a plurality of light sources (first light source 100-1 and second light source 100-2), and first light source 100-1 and second light source 100-2 are adjacent to each other to be arranged in series. For example, each of the plurality of light sources is formed of a straight tube type light source such as a fluorescent lamp or a light emitting diode (LED). First light source 100-1 and second light source 100-2 cultivate plant 103 by irradiating plant 103 which is planted in cultivation plate 102 of the plant cultivation space with the light.

For example, a length of first light source 100-1 or second light source 100-2 of illuminator 100 is 1280 mm which is the same as the length of the general straight tube type fluorescent lamp. As an example, illuminator 100 is installed in a ceiling of a rectangular parallelepiped cultivation space which is 2750 mm in length, is 750 mm in width, and is 300 mm in height, and first light source 100-1 and second light source 100-2 are provided at an interval of 190 mm from a center of the ceiling of the cultivation space.

Illumination tool attaching socket 100a, which is used in order to be attached to an illumination tool, is attached to socket portion 100b of each tip of first light source 100-1 and second light source 100-2. Since socket 100a and socket 100b do not emit the light by themselves, a light quantity in the cultivation space in the vicinity of socket portion 100b is lowered.

Figure 2:
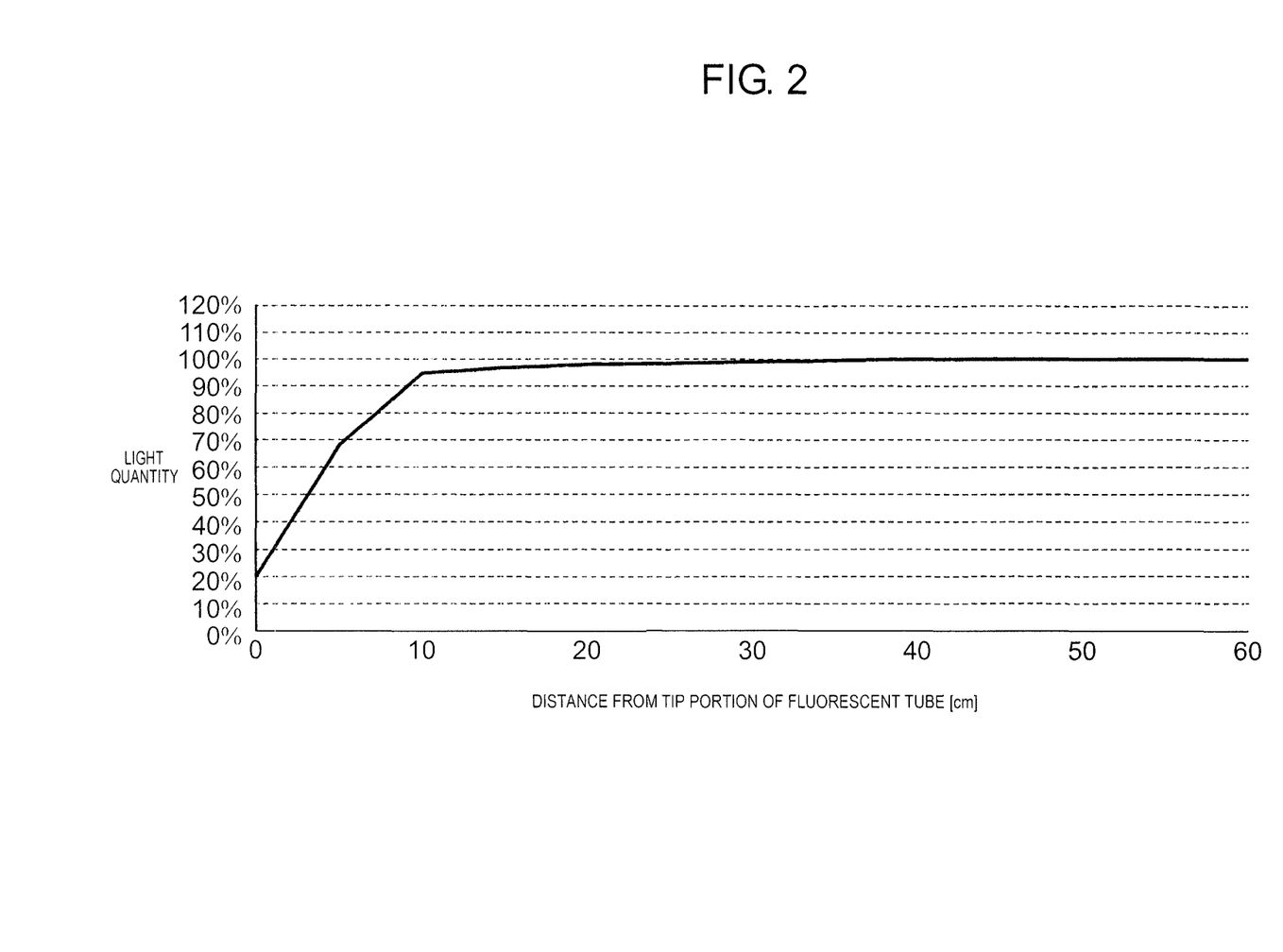
FIG. 2 is a diagram illustrating illuminance distribution of a fluorescent lamp in a configuration of the related art.

FIG. 2 is a diagram illustrating illuminance distribution (light quantity) of a fluorescent lamp in a configuration of the related art. In a case the fluorescent lamp is used for illuminator 100, there are electrodes in a fluorescent tube of the fluorescent lamp. As illustrated in FIG. 2, for example, the light quantity becomes small in a range of approximately 10 cm from a tip portion (that is, a position of 0 cm) of the fluorescent lamp.

Table 1 illustrates the light quantity in the configuration of the related art in which there is no light guide member 101. In Table 1, the fluorescent lamp is used for illuminator 100, a range which is up to 10 cm toward a center portion from the tip of the fluorescent lamp is defined as an illumination tip portion, and other ranges are defined as an illumination center portion. The light quantity in each range is measured using Light-MeterLI-250A of a light quantum flux density meter which is manufactured by Li-COR, Inc. The light quantities are measured, respectively at the time of no cultivation, at the time of raising seedling, and at the time of harvest. Table 2 illustrates results obtained by measuring a weight of the plant in the configuration of the related art in which there is no light guide member 101, respectively at the time of no cultivation, at the time of raising seedling, and at the time of harvest. The light quantity is displayed at the rate to the light quantity of the illumination center portion which is set to be 100. The weight is displayed at the rate to the weight of the plant in the illumination center portion which is set to be 100.

As a measurement condition, in a case where plant 103 is not cultivated (displayed as "no cultivation" in Table 1 and Table 2), a measuring device is installed on cultivation plate 102, whereby, measurement is performed. At the time of raising seedling finish of plant 103, and at the time of harvest of plant 103, the measuring device is installed in a tip portion of plant 103 such that the measuring device heads upwards in a vertical direction of a measurement surface, whereby, the measurement is performed. A distance between the measurement surface and illuminator 100, respectively, is 300 mm at the time of no cultivation, is 200 mm at the time of raising seedling finish, and is 100 mm at the time of harvest.

In Table 1, the light quantity of the illumination tip portion is lowered as plant 103 is grown such that the light quantity of the illumination tip portion, respectively, is 85 at the time of no cultivation, is 75 at the time of raising seedling, and is 56 at the time of harvest. Therefore, a difference between the illumination center portion and the illumination tip portion in light quantity becomes large. In Table 2, the weights of each plant at the time of raising seedling and at the time of harvest at this time are 78 on average at the time of raising seedling (this is an average value in a case of the number N of plants=8), and is 65 on average at the time of harvest (this is an average value in a case of the number N of plants=4).

In a case where the conditions other than the illumination are the same, the weight of plant 103 is proportional to an integrated light quantity for a cultivation period. The integrated light quantity of the illumination tip portion is 80 at the time of raising seedling, and is 66 at the time of harvest. The weight of the plant in the illumination tip portion is 78 at the time of raising seedling, and is 65 at the time of harvest. Thereby, it is possible to confirm a correlation between the integrated light quantity and the weight. Here, a lettuce is cultivated, as an example of the plant.

TABLE 1

|  | Light quantity at illumination center portion | Light quantity at illumination tip portion | Integrated light quantity at illumination tip portion/day |
|---|---|---|---|
| No cultivation | 100 | 85 | — |
| At the time of raising seedling | 100 | 75 | 80 |
| At the time of harvest | 100 | 56 | 66 |

TABLE 2

|  | Weight of illumination center portion | Weight of illumination tip portion |
|---|---|---|
| No cultivation | — | — |
| At the time of raising seedling | 100 | 78 |
| At the time of harvest | 100 | 65 |

In the related art, in a case where a yield rate of the weight is secured under such a condition, the number of cultivation days, an irradiation period of the illumination, or the like which is necessary for the weight of the plant in the illumination tip portion to be a predetermined weight or more is set such that the weight of the plant in the illumination tip portion of which the weight becomes small is a predetermined weight (in other words, a minimum necessary weight at the time of harvest) or more. However, if so, since the light quantity of the illumination center portion becomes too large, the weight of the plant in the illumination center portion at the time of harvest becomes larger by 40% or more.

In that case, the plant becomes too large, whereby, discoloration of leaves is caused, or the plant becomes too large than a package which is used at the time of shipment. As a result, there is a problem in that a time-consuming job such as a job of removing extra leaves is generated.

Therefore, the cultivation environment is made be homogenous as much as possible, whereby, it is possible to solve the problems. In the present disclosure, the configuration thereof is made such that the light quantity of the illumination center portion and the light quantity of the illumination tip portion are homogenized, by disposing light guide member 101. Hereinafter, the configuration will be described in detail.

Figure 3A:
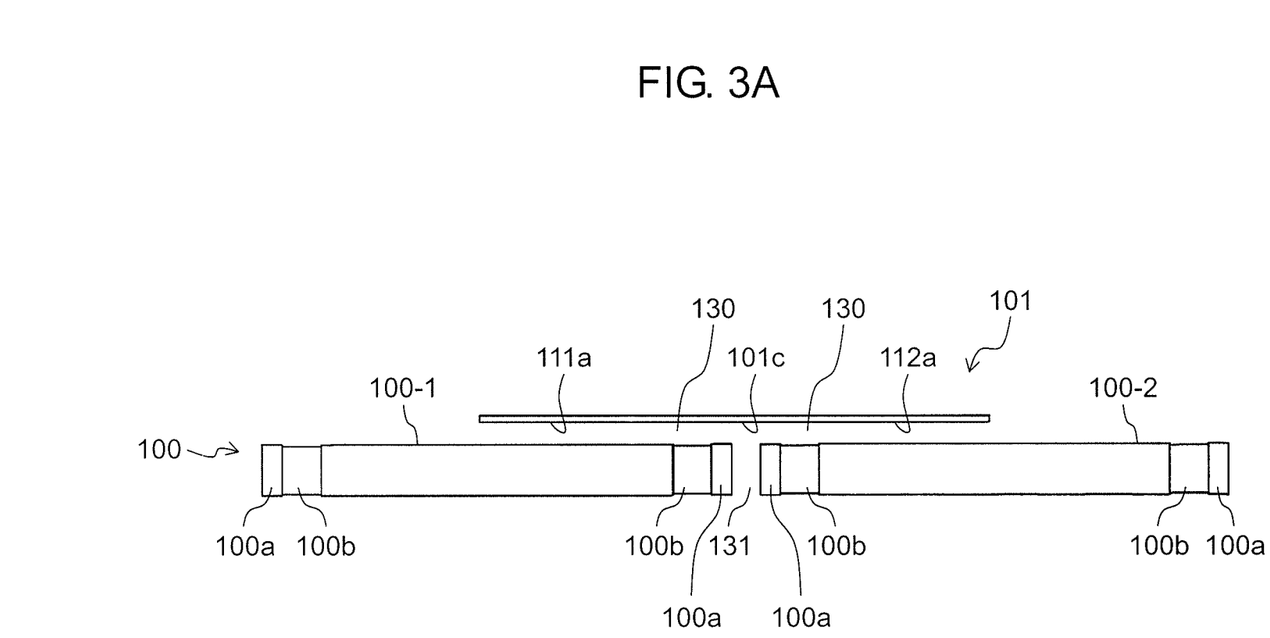
FIG. 3A is a schematic side view of the plant cultivation apparatus according to Exemplary Embodiment 1 of the present disclosure.
Figure 3B:
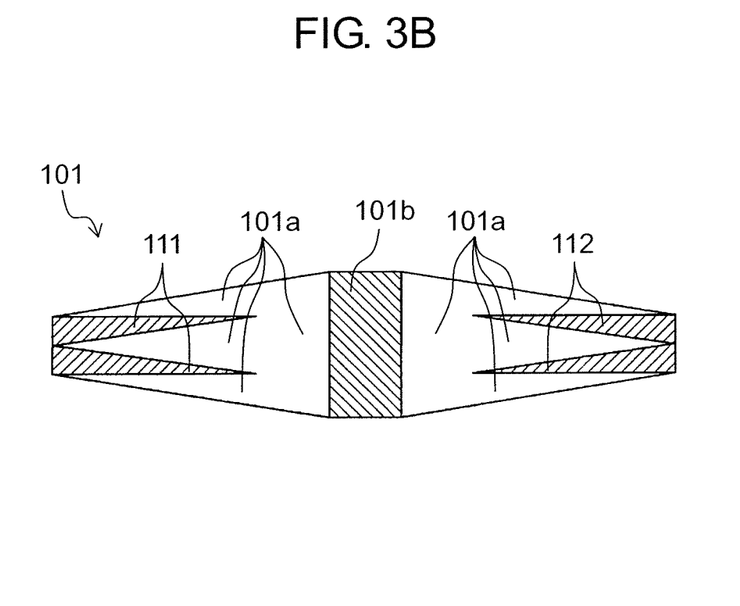
FIG. 3B is a plan view of a light guide member in the plant cultivation apparatus according to Exemplary Embodiment 1 of the present disclosure.
Figure 3C:
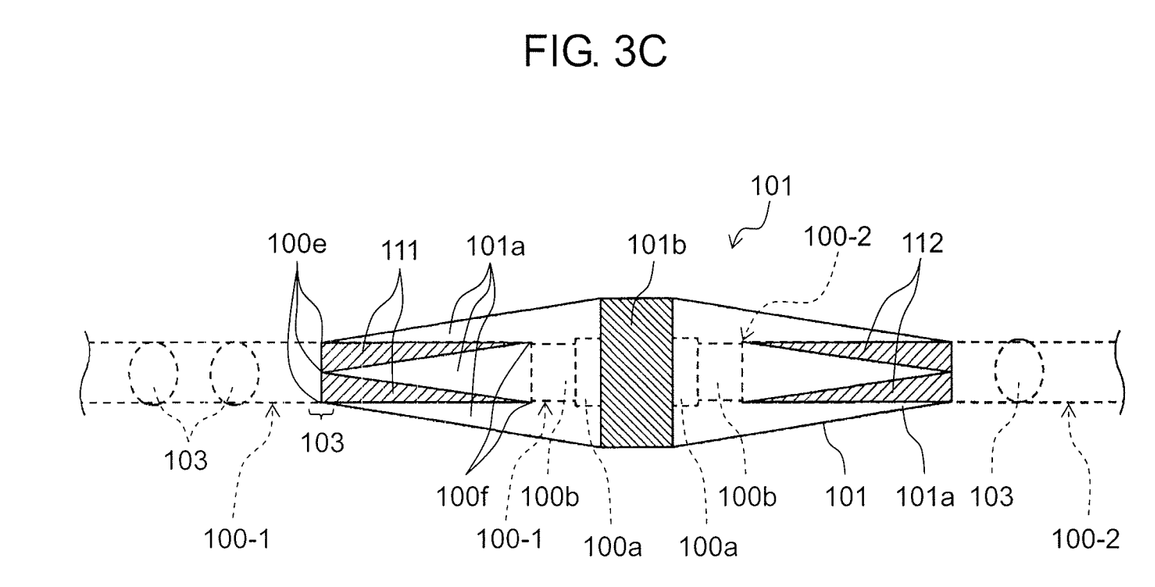
FIG. 3C is a plan view illustrating a disposition relationship between the light guide member, a fluorescent lamp and a plant in the plant cultivation apparatus according to Exemplary Embodiment 1 of the present disclosure.
Figure 3D:
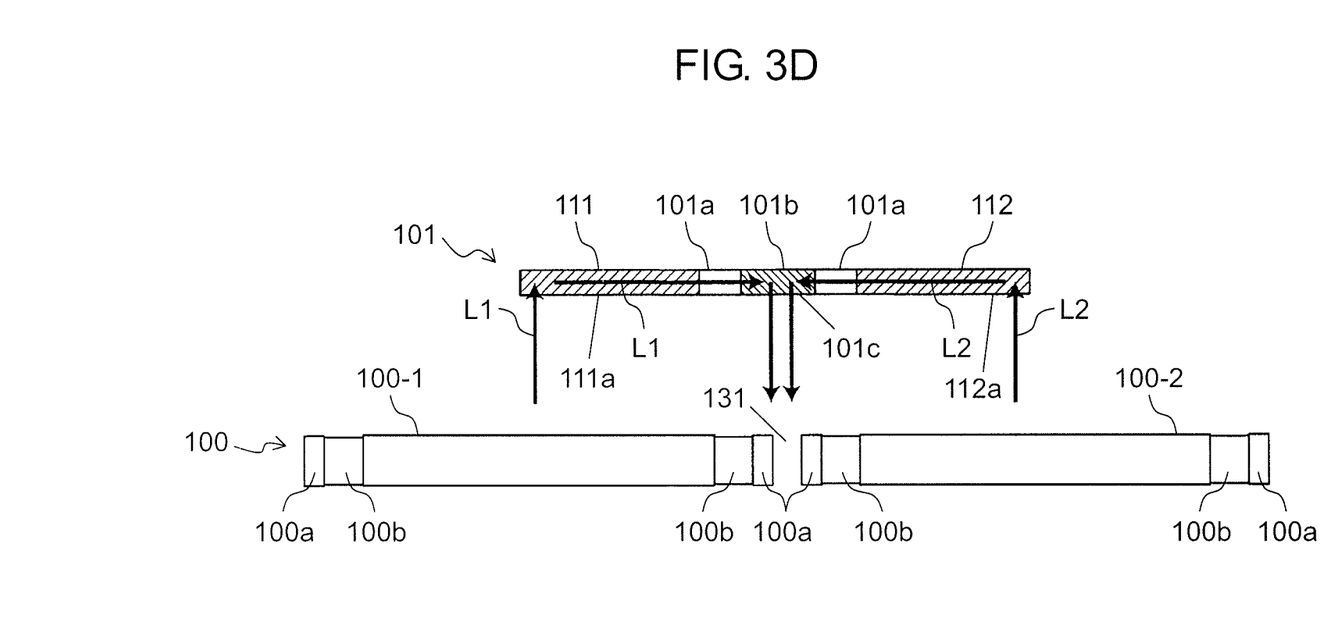
FIG. 3D is an explanatory diagram for describing a principle of light guide by the light guide member of the plant cultivation apparatus according to Exemplary Embodiment 1 of the present disclosure.

FIG. 3A is a schematic side view illustrating the vicinity of light guide member 101 of the plant cultivation apparatus according to Exemplary Embodiment 1, in a case where the fluorescent lamps are used for first light source 100-1 and second light source 100-2 of illuminator 100. FIG. 3B is a plan view of light guide member 101. FIG. 3C is a plan view illustrating a disposition relationship between light guide member 101, first light source 100-1, second light source 100-2 and plant 103. FIG. 3D is an explanatory diagram for describing a principle of light guide by light guide member 101. Here, each portion of oblique lines in FIG. 3B to FIG.

3D is not cross-hatching, but is assigned in order to discriminate a light emitter, a light receiver, and a light guider.

In FIG. 3A to FIG. 3D, light guide member 101 is used in the plant cultivation apparatus that performs the cultivation of plant 103 using light L1 (see FIG. 3D) which is emitted from first light source 100-1 and light L2 (see FIG. 3D) which is emitted from second light source 100-2. Light guide member 101 is disposed above first light source 100-1 and second light source 100-2 which are adjacent to each other among the plurality of light sources with gap 130 with respect to first light source 100-1 and second light source 100-2. Furthermore, light guide member 101 is disposed to straddle first light source 100-1 and second light source 100-2, and to cover at least a portion of first light source 100-1 and at least a portion of second light source 100-2. Light guide member 101 is disposed along a longitudinal direction of first light source 100-1 and second light source 100-2. That is, the longitudinal direction of light guide member 101 is matched up with the longitudinal direction of first light source 100-1 and second light source 100-2.

As illustrated in FIG. 3A, light guide member 101 is disposed with gap 130 above gap 131 between first light source 100-1 and second light source 100-2.

For example, light guide member 101 is a rectangle-shaped member, which has a form of a transparent and thin board, and includes first light receiver 111, second light receiver 112, light guider 101a, and light emitter 101b. In the longitudinal direction of light guide member 101, first light receiver 111 is disposed to be connected to one end side of light emitter 101b through light guider 101a. Second light receiver 112 is disposed to be connected to the other end side of light emitter 101b through light guider 101a. For example, light guide member 101 is configured to be integral by a transparent resin having light-transmitting properties such as an acrylic resin.

In FIG. 3D, first light receiver 111 is formed of a prism, and exhibits the following actions. First light receiver 111 receives first light L1 which is emitted upwards from first light source 100-1 into first light receiver 111, in a direction intersecting with the longitudinal direction of light guide member 101. That is, first light receiver 111 receives first light L1 from first facing surface 111a which faces first light source 100-1. In more detail, first light receiver 111 receives first light L1, in a region that is from at least the center portion in the longitudinal direction of first light source 100-1 up to an end portion of first light source 100-1 which faces an end portion of second light source 100-2. In first light receiver 111, received first light L1 is refracted, is output toward light emitter 101b along the longitudinal direction of light guide member 101, and is sent to light emitter 101b. For example, a planar shape of first light receiver 111 is a shape that is tapered toward light emitter 101b. As an example, the planar shape of first light receiver 111 is configured by arranging two substantial isosceles triangles which are formed such that a base side is disposed in the center portion in the longitudinal direction of first light source 100-1, and a peak is disposed in the vicinity of light emitter 101b in parallel (that is, as an oblique lined region on a left end side in FIG. 3B).

In the same manner, second light receiver 112 is formed of a prism, and exhibits the following actions. Second light receiver 112 receives second light L2 which is emitted upwards from second light source 100-2 into second light receiver 112, in the direction intersecting with the longitudinal direction of light guide member 101. That is, second light receiver 112 receives second light L2 from second facing surface 112a which faces second light source 100-2. In more detail, second light receiver 112 receives second light L2, in a region that is from at least the center portion in the longitudinal direction of second light source 100-2 up to the end portion of second light source 100-2 which faces the end portion of first light source 100-1. In second light receiver 112, received second light L2 is refracted, is output toward light emitter 101b along the longitudinal direction of light guide member 101, and is sent to light emitter 101b. For example, the planar shape of second light receiver 112 is a shape that is tapered toward light emitter 101b. As an example, the planar shape of second light receiver 112 is configured by arranging two substantial isosceles triangles which are formed such that the base side is disposed in the center portion in the longitudinal direction of second light source 100-2, and the peak is disposed in the vicinity of light emitter 101b in parallel (that is, as an oblique lined region on a right end side in FIG. 3B).

As an example of the substantial isosceles triangle of first light receiver 111 (or second light receiver 112), as viewed from above in an installed state (that is, in a case of a planar view), the isosceles triangle is configured by total three points of two points of center point 100e of illuminator 100 and one point of point 100f in the end portion of an electrode portion, as illustrated in FIG. 3C. In this case, for example, first light receiver 111 (or second light receiver 112) is a substantial isosceles triangle of which the base side is 1080 mm, and the height is 12.5 mm.

As a planar shape of light guider 101a, the planar shape is configured by two trapezoid shapes of which the base sides are connected to each other. Each base side of the trapezoid shape, and the base side of two substantial isosceles triangles of the light receiver are connected to each other in an overlapped manner. That is, light guider 101a is configured as a portion (that is, a white background region in FIG. 3B) other than first light receiver 111, second light receiver 112, and light emitter 101b. Light guider 101a guides first light L1 and second light L2 which are respectively received from first light receiver 111 and second light receiver 112, toward light emitter 101b.

Light emitter 101b is disposed at the center of light guide member 101, and has third facing surface 101c which faces an upper portion of one end portion of first light source 100-1, and an upper portion of one end portion of second light source 100-2. First light L1 and second light L2 which are transmitted through light guider 101a after being respectively received from first light receiver 111 and second light receiver 112, and being refracted, are received into light emitter 101b. In light emitter 101b, first light L1 and second light L2 are refracted in the direction intersecting with the longitudinal direction of light guide member 101. Plant 103 is irradiated with first light L1 and second light L2 through the end portion of light source 100-1 and the end portion of second light source 100-2, from third facing surface 101c which faces the upper portion of the end portion of first light source 100-1 and the upper portion of the end portion of second light source 100-2. Light emitter 101b may be configured to have a length such that a whole of gap 131 between two first light source 100-1 and second light source 100-2 is irradiated. Alternatively, light emitter 101b may be provided such that light emitter 101b passes through a lower side of gap 131, and light emitter 101b projects to be hanged immediately above plant 103. Here, gap 131 is not a light source, but an example of a non-light emitting portion which does not emit the light.

As an example, in first light receiver 111 and second light receiver 112, the light quantity in each center portion of first light source 100-1 and second light source 100-2 is large, and the light quantity becomes smaller as being closer to the tip portion, as viewed from above in the rectangular parallelepiped of the cultivation space. In order to guide the light of the center portion as much as possible, first light receiver 111 and second light receiver 112 have features to be formed into a tapered shape such that areas of first light receiver 111 and second light receiver 112 in the center portion of the light source are large, and the areas of first light receiver 111 and second light receiver 112 become gradually smaller to the tip portion of the light source. That is, first light receiver 111 or second light receiver 112 has a substantial isosceles triangle shape which is tapered toward a side of light emitter 101b.

According to the configuration of Exemplary Embodiment 1, first light L1 and second light L2 which are emitted upwards from illuminator 100 are guided from the center portions of first light source 100-1 and second light source 100-2 of illuminator 100 to the vicinity of gap 131 in the tip portions thereof by light guide member 101, whereby, it is possible to improve a lack of the light quantity in the vicinity of gap 131 of illuminator 100. In particular, as first light receiver 111 and second light receiver 112, a light reception area is made large in the illumination center portion of which the light quantity is large, whereby, first light L1 and second light L2 are largely received, and the light reception area is made small in the illumination tip portion of which the light quantity is small to make light guider 101a large, whereby, it is possible to emit the light from light emitter 101b. By such a configuration, it is possible to homogenize light quantity distribution from the center portion to the vicinity of the tip portion. According to the configuration described above, it is possible to improve a weight lack and succulent growth of plant 103 due to the lack of the light quantity in a portion of gap 131 between the light sources which are adjacent to each other in particular. As a result, it is possible to reduce variations in harvest weight.

In the configuration of the related art in which there is no light guide member 101, it is not possible to effectively utilize the light which is emitted toward an upper side of the fluorescent lamp for the growth of plant 103. However, in Exemplary Embodiment 1, the light which is emitted toward the upper side of the fluorescent lamp is guided to the tip portion side, and plant 103 is irradiated with the light, whereby, it is possible to cultivate the plant with higher efficiency.

Table 3 illustrates results obtained by measuring the light quantity at the time of harvest when the measurement was performed under the same measurement conditions as in Table 1 and in Table 2 with the configuration of the related art except that light guide member 101 was installed.

TABLE 3

| | Light quantity at illumination center portion | Light quantity at illumination tip portion | Integrated light quantity at illumination tip portion/day |
|---|---|---|---|
| At the time of harvest | 100 | 101 | 100 |

In Table 3, it is possible to confirm that the light quantity of the illumination center portion and the light quantity of the illumination tip portion are substantially the same, and it is possible to realize a more homogenous light quantity environment.

Exemplary Embodiment 2

Exemplary Embodiment 2 is a case where a light emitting diode (LED) is used for illuminator 100, differently from the fluorescent lamp of Exemplary Embodiment 1. There is no electrode portion in an LED illumination, and the light quantity is not lowered in the illumination tip portion unlike in the fluorescent lamp.

However, a problem in that a light quantum flux density of a portion of gap 132 (see FIG. 4B and FIG. 4D) between the LED illuminations becomes small which is generated when the LED illumination is attached to the illumination tool, is not solved even in a case where the LED illumination is used in replacement of the fluorescent lamp. Since the LED illumination has directivity in general, it is possible to irradiate only a cultivation surface of plant 103 with the light. Therefore, it is not possible to use light for the cultivation by guiding the light which is emitted upwards, without directly irradiating plant 103, in the same manner as Exemplary Embodiment 1. The portion of gap 132 is another example of the non-light emitting portion.

Figure 4A:
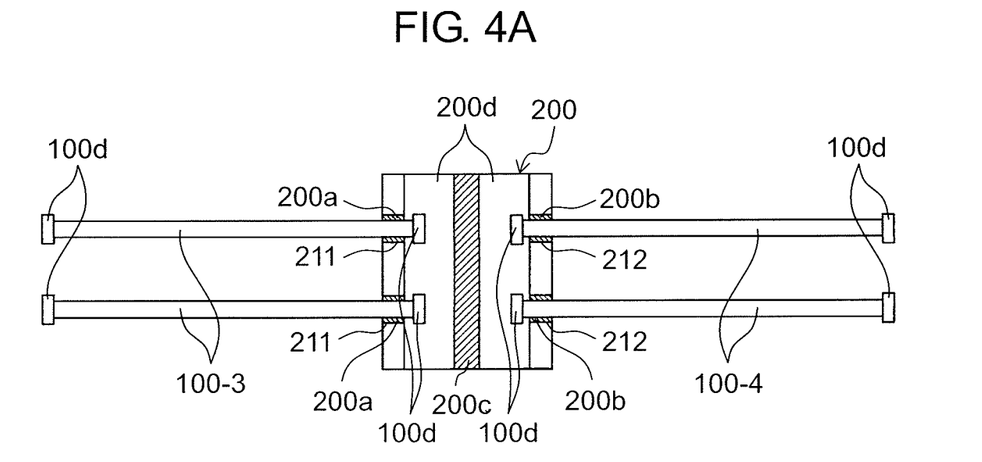
FIG. 4A is a schematic plan view of a light guide member in a plant cultivation apparatus according to Exemplary Embodiment 2 of the present disclosure.
Figure 4B:
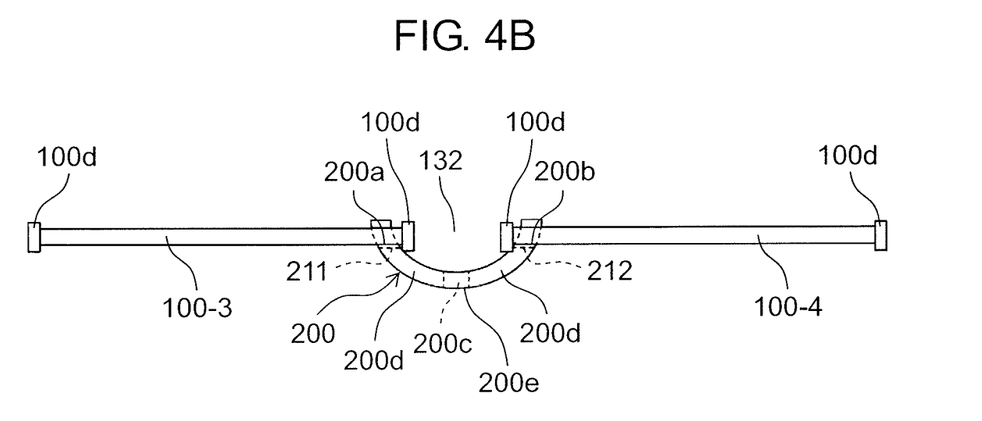
FIG. 4B is a schematic side view of the light guide member in the plant cultivation apparatus according to Exemplary Embodiment 2 of the present disclosure.
Figure 4C:
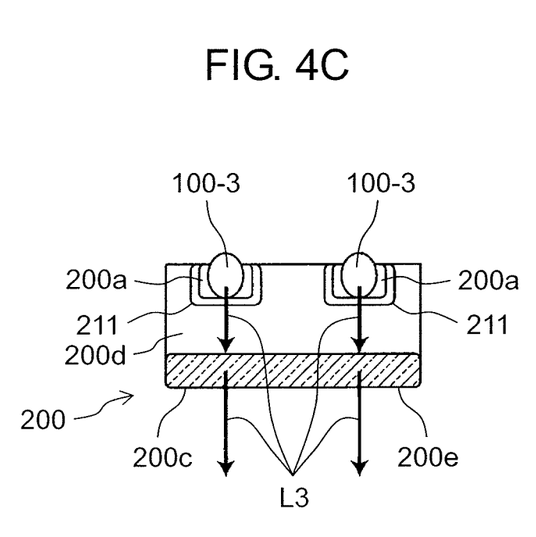
FIG. 4C is a sectional side view of an LED in a longitudinal direction in order to describe a disposition relationship between the light guide member and the LED in the plant cultivation apparatus according to Exemplary Embodiment 2 of the present disclosure.
Figure 4D:
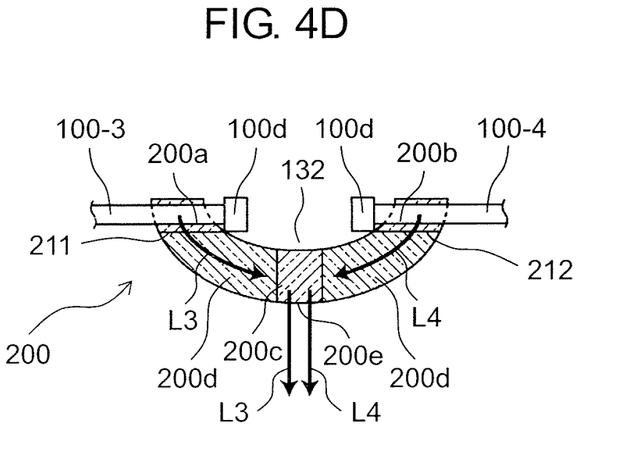
FIG. 4D is a sectional side view of a semi-cylinder shape in a direction orthogonal to an axis in order to describe a principle of light guide by the light guide member in the plant cultivation apparatus according to Exemplary Embodiment 2 of the present disclosure.

In order to solve the problems described above, light guide member 200 illustrated in FIG. 4A to FIG. 4D is used. FIG. 4A is a schematic plan view of light guide member 200 in a plant cultivation apparatus according to Exemplary Embodiment 2. FIG. 4B is a schematic side view of light guide member 200. FIG. 4C is a sectional side view of the LED in the longitudinal direction in order to describe a disposition relationship between light guide member 200, and LED 100-3 and LED 100-4. FIG. 4D is a sectional side view of a semi-cylinder shape in a direction orthogonal to an axis in order to describe a principle of light guide by light guide member 200. However, a portion of oblique lines in FIG. 4A is not cross-hatching, but is assigned in order to discriminate the light emitter, the light receiver, and the light guider.

In FIG. 4A to FIG. 4D, in Exemplary Embodiment 2, the light source of illuminator 100 is a straight tube type LED, and third light source 100-3 and fourth light source 100-4 are arranged to be adjacent to each other in series, and the end portion of third light source 100-3 and the end portion of fourth light source 100-4 are disposed to be close to each other. Socket 100d, which is used in order to be attached to the illumination tool, is fixed to each of both end portions of third light source 100-3 and fourth light source 100-4.

In this manner, in a case where the light sources are third light source 100-3 and fourth light source 100-4 of the LEDs, light guide member 200 is disposed as follows. For example, light guide member 200 is formed of a transparent member of a semi-cylinder shape which has an axial direction in a direction intersecting with (for example, a direction orthogonal to) the longitudinal direction of third light source 100-3 and fourth light source 100-4, and projects downwards. Light guide member 200 is disposed to straddle, and to cover a lower side of the end portion of third light source 100-3 and a lower side of the end portion of fourth light source 100-4.

Light guide member 200 includes third light receiver 211, fourth light receiver 212, light emitter 200c, and light guider 200d. For example, light guide member 200 is configured to be integral by a transparent resin having light-transmitting properties such as an acrylic resin.

Each of third light receiver 211 and fourth light receiver 212 is formed of a prism. Third light receiver 211 and fourth light receiver 212 are respectively formed into a C shape and disposed at edge portions of rectangle-shaped openings 200a and 200b which are provided in pairs and formed at an interval in upper end portions on both sides in a circumferential direction of the semi-cylinder shape. In a case where third light source 100-3 and fourth light source 100-4 emit the light only downwards, third light receiver 211 and fourth light receiver 212 may be disposed in a board shape only on lower surface sides of third light source 100-3 and fourth light source 100-4. In the end portion of third light source 100-3, third light L3 which is emitted downwards from third light source 100-3 is received into third light receiver 211 in the direction (in other words, the circumferential direction of the semi-cylinder shape) intersecting with the longitudinal direction of light guide member 200. In third light receiver 211, received third light L3 is refracted, is output toward light emitter 200c along the longitudinal direction of light guide member 200, and is sent to light emitter 200c.

In the same manner, at the end portion of fourth light source 100-4, fourth light L4 which is emitted downwards from fourth light source 100-4 is received into fourth light receiver 212 in the direction (that is, the circumferential direction of the semi-cylinder shape) intersecting with the longitudinal direction of light guide member 200. In fourth light receiver 212, received fourth light L4 is refracted, is output toward light emitter 200c along the longitudinal direction of light guide member 200, and is sent to light emitter 200c.

Light guider 200d is formed of a transparent portion of the semi-cylinder shape which is bent, as a middle portion between the upper end portion and the lower end portion of the semi-cylinder shapes, and guides third light L3 and fourth light L4 which are respectively received from third light receiver 211 and fourth light receiver 212 toward light emitter 200c.

Light emitter 200c is disposed in the lower end portion at the middle between the upper end portions of the semi-cylinder shape to be extended in an axial direction of a cylinder shape. Light emitter 200c is disposed at the center of light guide member 200, and is positioned below the portion of gap 132 between one end portion of third light source 100-3 and one end portion of fourth light source 100-4. Light emitter 200c has fourth facing surface 200e on a lower surface thereof. Third light L3 and fourth light L4 which are transmitted through light guider 200d after being respectively received from third light receiver 211 and fourth light receiver 212, and being refracted, are received into light emitter 200c. In light emitter 200c, third light L3 and fourth light L4 are refracted in the direction intersecting with the longitudinal direction of light guide member 200, and plant 103 is irradiated with the light from fourth facing surface 200e of light emitter 200c.

In a case where illuminator 100 is the fluorescent lamp, light guide member 200 may be applied thereto. That is, light guide member 200 is formed in the semi-cylinder shape which has the axial direction in the direction intersecting with the longitudinal direction of the light source and projects downwards, and is disposed to cover the lower side of the end portion of the first light source and the lower side of the end portion of the second light source.

Here, light guide member 200 is designed not to interfere with each of sockets 100d. For example, in a case where the portion of gap 132 between the end portions is 100 mm in length, and socket 100d is 30 mm in length, radius R on an inside of the semi-cylinder shape is set to be 100 mm, whereby, light guide member 200 of the semi-cylinder shape is configured not to be in contact with each of sockets 100d.

A diameter varies depending on the shape of the LED, but the diameter of the generally used LED is 30 mm. Therefore, third light receiver 211 and fourth light receiver 212 are disposed at edge portions of openings 200a and 200b having a size such that the LEDs are capable of engaging the openings. It is desirable that a leakage of the light is prevented by a configuration such that an LED engages the opening with a gap as small as possible, for example, of 1 mm, between opening 200a or 200b and the outer surface of third light source 100-3 or fourth light source 100-4.

It is desirable that light guide member 200 is disposed so that illuminator 100 is not in contact with third light receiver 211 and fourth light receiver 212. In light guide member 200, third light L3 and fourth light L4 which are collected by third light receiver 211 and fourth light receiver 212 are guided by light guider 200d. From fourth facing surface 200e of light emitter 200c, plant 203 which is planted below the surface is irradiated with the light.

According to the configuration of Exemplary Embodiment 2, light L3 and light L4 which are emitted immediately below from illuminator 100 are guided to the portion of gap 132 between the end portions of third light source 100-3 and fourth light source 100-4 by light guide member 200, whereby, it is possible to improve the lack of the light quantity in the portion of gap 132 of illuminator 100. By such a configuration, it is possible to homogenize the light quantity distribution from the center portion to the vicinity of the end portion. According to the configuration described above, it is possible to improve the weight lack and the succulent growth of plant 103 due to the lack of the light quantity in the portion of gap 132 between the light sources which are adjacent to each other. As a result, it is possible to reduce the variations in harvest weight.

Any exemplary embodiments or modification examples are appropriately combined in various exemplary embodiments or modification examples described above, whereby, it is possible to achieve the effects which are included in each. Moreover, it is possible to combine the exemplary embodiments with each other, it is possible to combine the examples with each other, or it is possible to combine the exemplary embodiments and the examples with each other. It is possible to combine the features with each other, in the exemplary embodiments or the examples which are different from each other.

As described above, according to the aspects of the present disclosure, it is possible to homogenize the light quantity distribution by guiding the light to the region of which the light quantity is small from the region of which the light quantity from the light source is large, with the light guide member.

The plant cultivation apparatus according to the present disclosure is capable of homogenizing vegetables to be cultivated, and cultivating the vegetables with a small cultivation loss, by homogenizing the cultivation environment at a low cost in a plant factory.

What is claimed is:

1. An illumination apparatus, comprising:
a first light source configured to emit first light;
a second light source configured to emit second light, the first light source and the second light source being arranged substantially linearly; and
a light guide member apart from both the first light source and the second light source, the light guide member including:
a first light receiving portion configured to receive the first light;
a second light receiving portion configured to receive the second light; and
a light emitting portion between the first light receiving portion and the second light receiving portion,
wherein the first light receiving portion is configured to refract the first light toward the light emitting portion, the second light receiving portion is configured to refract the second light toward the light emitting portion, the light emitting portion is configured to refract the first light and the second light toward a space between the first light source and the second light source, and each of the first light receiving portion and the second light receiving portion includes two prisms configured to refract light.

2. The illumination apparatus according to claim 1, wherein each of the first light source and the second light source includes a fluorescent lamp.

3. The illumination apparatus according to claim 1, wherein the light guide member is parallel with both the first light source and the second light source.

4. The illumination apparatus according to claim 1, wherein the light guide member has a board shape.

5. The illumination apparatus according to claim 1, wherein the light guide member further includes:
- a first light guiding portion optically connecting the first light receiving portion and the light emitting portion; and
- a second light guiding portion optically connecting the second light receiving portion and the light emitting portion.

6. The illumination apparatus according to claim 1, wherein a width of the light emitting portion is larger than a width of each of the first light receiving portion and the second light receiving portion.

7. The illumination apparatus according to claim 1, wherein
the first light source and the second light source are spaced apart, with the space being between the first light source and the second light source, and
end portions of the first light source and the second light source adjacent the space are not configured to emit light.

8. The illumination apparatus according to claim 1, wherein each of the first light receiving portion and the second light receiving portion includes a tapered shape, with the tapered shape becoming smaller toward the light emitting portion.

9. The illumination apparatus according to claim 1, wherein at least one of the two prisms has a triangular shape.

10. The illumination apparatus according to claim 7, wherein the at least one of the two prisms is configured such that the triangular shape tapers toward the light emitting portion.

11. A system for cultivating plants, comprising:
the illumination apparatus according to claim 1; and
a plate configured to support plants to be cultivated.

12. The system according to claim 11, wherein the light emitting portion is configured to refract the first light and the second light towards an area of the plate facing the space between the first light source and the second light source.

13. The illumination apparatus according to claim 1, wherein each of the two prisms has a triangular shape.

14. The illumination apparatus according to claim 13, wherein each of the two prisms is configured such that the triangular shape tapers toward the light emitting portion.

15. The illumination apparatus according to claim 14, wherein a side surface of a first of the two prisms is parallel with a side surface of a second of the two prisms.

16. The illumination apparatus according to claim 1, wherein the light emitting portion of the light guide member is apart from and aligned with the space between the first light source and the second light source.

17. The illumination apparatus according to claim 16, wherein a length of the light emitting portion of the light guide member is greater than a distance between the first light source and the second light source.

18. The illumination apparatus according to claim 17, wherein the length of the light emitting portion of the light guide member is less than a distance between the first light source and the second light source.

\* \* \* \* \*